US011151725B2

(12) United States Patent
Li et al.

(10) Patent No.: US 11,151,725 B2
(45) Date of Patent: Oct. 19, 2021

(54) IMAGE SALIENT OBJECT SEGMENTATION METHOD AND APPARATUS BASED ON RECIPROCAL ATTENTION BETWEEN FOREGROUND AND BACKGROUND

(71) Applicant: BEIHANG UNIVERSITY, Beijing (CN)

(72) Inventors: Jia Li, Beijing (CN); Changqun Xia, Beijing (CN); Jinming Su, Beijing (CN); Qinping Zhao, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 190 days.

(21) Appl. No.: 16/581,680

(22) Filed: Sep. 24, 2019

(65) Prior Publication Data
US 2020/0372660 A1 Nov. 26, 2020

(30) Foreign Application Priority Data
May 21, 2019 (CN) .......................... 201910423491.3

(51) Int. Cl.
*G06K 9/00* (2006.01)
*G06T 7/194* (2017.01)
(Continued)

(52) U.S. Cl.
CPC .............. *G06T 7/194* (2017.01); *G06F 17/15* (2013.01); *G06F 17/16* (2013.01); *G06N 3/0481* (2013.01);
(Continued)

(58) Field of Classification Search
CPC ........................................... G06T 2207/20084
See application file for complete search history.

(56) References Cited

U.S. PATENT DOCUMENTS

2017/0053181 A1* 2/2017 Tunali ................... G06K 9/2081
2018/0307935 A1* 10/2018 Rao ....................... G06K 9/3233
(Continued)

FOREIGN PATENT DOCUMENTS

| CN | 107330381 A | 11/2007 |
|---|---|---|
| CN | 103065136 A | 4/2013 |
| CN | 106203430 A | 12/2016 |
| CN | 108428234 A | 8/2018 |
| CN | 109308459 A | 2/2019 |

OTHER PUBLICATIONS

Y. Zeng, M. Feng, H. Lu, G. Yang and A. Borji, "An Unsupervised Game-Theoretic Approach to Saliency Detection," in IEEE Transactions on Image Processing, vol. 27, No. 9, pp. 4545-4554, Sep. 2018, doi: 10.1109/TIP.2018.2838761. (Year: 2018).*
(Continued)

*Primary Examiner* — Hadi Akhavannik
(74) *Attorney, Agent, or Firm* — J.C. Patents

(57) ABSTRACT

An image salient object segmentation method and an apparatus based on reciprocal attention between a foreground and a background, and the method includes: obtaining a feature map corresponding to a training image based on a convolutional neural backbone network, and obtaining foreground and background initial feature responses according to the feature map; obtaining a reciprocal attention weight matrix, and updating the foreground and background initial feature responses according to the reciprocal attention weight matrix, to obtain foreground and background feature maps; training the convolutional neural backbone network according to the foreground and the background feature maps based on a cross entropy loss function and a cooperative loss function, to obtain a foreground and background segmentation convolutional neural network model; and inputting an image to be segmented into the foreground and background segmentation convolutional neural network model to obtain foreground and background prediction results.

9 Claims, 8 Drawing Sheets

(51) Int. Cl.
*G06F 17/15* (2006.01)
*G06F 17/16* (2006.01)
*G06N 3/04* (2006.01)

(52) U.S. Cl.
CPC ............... *G06T 2207/20081* (2013.01); *G06T 2207/20084* (2013.01)

(56) References Cited

U.S. PATENT DOCUMENTS

| | | | |
|---|---|---|---|
| 2019/0034734 A1* | 1/2019 | Yen | G06T 7/246 |
| 2019/0130188 A1* | 5/2019 | Zhou | G06T 7/248 |
| 2019/0130189 A1* | 5/2019 | Zhou | G06K 9/00718 |

OTHER PUBLICATIONS

B. Jiang, X. Jiang, J. Tang, B. Luo and S. Huang, "Multiple Graph Convolutional Networks for Co-Saliency Detection," 2019 IEEE International Conference on Multimedia and Expo (ICME), 2019, pp. 332-337, doi: 10.1109/ICME.2019.00065. (Year: 2019).*
The first Office Action of CN application No. 201910423491.3.
D1: "Saliency detection combining foreground and background features based on manifold ranking", Journal of Computer Application 2016, 36(9); 2560-2565.
D2: "Progressive Attention Guided Recurrent Network for Salient Object Detection".
D3: "Uncovering the Effect of Visual Saliency on Image Retrieval(1)".

* cited by examiner

IMAGE SALIENT OBJECT SEGMENTATION METHOD AND APPARATUS BASED ON RECIPROCAL ATTENTION BETWEEN FOREGROUND AND BACKGROUND

CROSS-REFERENCE TO RELATED APPLICATIONS

This application claims priority to Chinese Patent Application No. 201910423491.3, filed on May 21, 2019, which is incorporated herein by reference in its entirety.

TECHNICAL FIELD

The embodiments of the present disclosure relate to the field of computer vision, and more particularly to an image salient object segmentation method and an apparatus based on reciprocal attention between a foreground and a background.

BACKGROUND

Salient target detection is usually designed to detect the most prominent objects in a scene and accurately segment the entire outline of these salient objects. Enhancements can be made in many areas of computer vision and image processing by salient segmentation methods such as content-aware image editing, visual tracking, character re-recognition, and image retrieval. Although numerous methods for detecting salient objects using different hand-designed features have been proposed, detecting the salient objects in a complex scene remains a huge challenge.

In recent years, with continuous development of convolutional neural networks, learned features have more powerful expression capability, and many salient object detection methods based on deep convolutional neural networks have achieved good results on benchmark dataset. There are many existing salient object segmentation methods, including residual learning method which guides salient result optimization by a reverse attention, a method for improving the expression capability of convolution features by aggregating image context from global and local perspectives using iterative mechanism, thereby making salient object detection result more accurate and a method for adaptively effectively combining multiple levels of features using a two-way message passing module, and the like. In fact, objects with the same semantics show varying degrees of visual attention in images with different backgrounds. For example, in one image, a person is the most salient object, but in another image, the person becomes a background relative to a ship, and the ship becomes a foreground. These methods above mainly focus on how to better integrate context information on the upper and lower levels or on multiple different scales, and do not perform processing according to characteristics of salient object detection tasks.

Therefore, there is an urgent need for a salient object segmentation method to solve the problem that the existing segmentation methods only rely on characterizing a feature expression of a foreground in an image, and do not deeply explore how a constructed network reflects a potential nature of salient target detection and thus results in a poor salient object segmentation effect.

SUMMARY

The embodiments of the present disclosure provide an image salient object segmentation method and an apparatus based on reciprocal attention between a foreground and a background, so as to solve the problem that the prior art only relies on characterizing a feature expression of the foreground in an image and thus results in a poor salient object segmentation effect.

In a first aspect, an embodiment of the present disclosure provides an image salient object segmentation method based on reciprocal attention between a foreground and a background, including:

obtaining a feature map corresponding to a training image based on a convolutional neural backbone network, and obtaining a foreground initial feature response and a background initial feature response according to the feature map corresponding to the training image;

obtaining a reciprocal attention weight matrix according to the foreground initial feature response and the background initial feature response, and updating the foreground initial feature response and the background initial feature response according to the reciprocal attention weight matrix to obtain a foreground feature map and a background feature map;

training the convolutional neural backbone network according to the foreground feature map and the background feature map based on a cross entropy loss function and a cooperative loss function, to obtain a foreground and background segmentation convolutional neural network model; and inputting an image to be segmented into the foreground and background segmentation convolutional neural network model to obtain a foreground prediction result and a background prediction result.

In a possible design, the obtaining a feature map corresponding to a training image based on a convolutional neural backbone network, and obtaining a foreground initial feature response and a background initial feature response according to the feature map corresponding to the training image, specifically includes:

inputting the training image, and extracting a branch feature from the training image according to the convolutional neural backbone network, to obtain the feature map corresponding to the training image;

performing a foreground feature aggregating on the feature map corresponding to the training image to obtain the foreground initial feature response; and performing a background feature aggregating on the feature map corresponding to the training image to obtain the background initial feature response.

In a possible design, the obtaining a reciprocal attention weight matrix according to the foreground initial feature response and the background initial feature response, and updating the foreground initial feature response and the background initial feature response according to the reciprocal attention weight matrix to obtain a foreground feature map and a background feature map, specifically includes:

obtaining a corresponding foreground response map and a corresponding background response map according to the foreground initial feature response and the background initial feature response;

obtaining the reciprocal attention weight matrix according to the foreground response map and the background response map;

multiplying the foreground initial feature response by the reciprocal attention weight matrix to obtain a first result, and multiplying the background initial feature response by the reciprocal attention weight matrix to obtain a second result;

summing the first result and the background initial feature response to obtain the background feature map; and summing the second result and the foreground initial feature response to obtain the foreground feature map.

In a possible design, the cross entropy loss function is specifically:

$$L_{ce}=D_c(\text{Sig}(\varphi_B(\pi_B)),G_B)+i\,D_c(\text{Sig}(\varphi_F(\pi_F)),G_F),$$

where, $L_{ce}$ is the cross entropy loss function, $\text{Sig}(\cdot)$ is a sigmoid function, $D_c(\cdot)$ is a cross entropy function, $\varphi_B(\pi_B)$ is the background feature map, $\varphi_F(\pi_F)$ is the foreground feature map, $G_B$ is a reference map of a background image, and $G_F$ is a reference map of a foreground map.

In a possible design, the cooperative loss function is specifically:

$$L_{kl}=D_{kl}(\text{Sig}(\phi_B(\pi_B)),1-\text{Sig}(\phi_F(\pi_F)))+D_{kl}(\text{Sig}(\phi_B(\pi_B)),\text{Sig}(\phi_F(\pi_F))),$$

where, $L_{kl}$ is the cooperative loss function, $D_{kl}(\cdot)$ is a KL (Kullback-Leibler) distance, $\text{Sig}(\cdot)$ is a sigmoid function, $\phi_B(\pi_B)$ is the background feature map, and $\varphi_F(\pi_F)$ is the foreground feature map.

In a possible design, after the inputting an image to be segmented into the foreground and background segmentation convolutional neural network model to obtain a foreground prediction result and a background prediction result, the method further includes:

obtaining a difference value between the foreground prediction result and the background prediction result to obtain a corresponding difference image; and filtering pixel points of the difference image according to a preset threshold to obtain a salient object segmentation result.

In a possible design, the salient object segmentation result is specifically:

$$\text{Sal}=relu(\text{Sig}(\varphi_F(\pi_F))-\text{Sig}(\varphi_B(\pi_B))),$$

where, Sal is the salient object segmentation result, $relu(\cdot)$ is a ReLU activation function, $\text{Sig}(\cdot)$ is a sigmoid function, $\varphi_B(\pi_B)$ is the background feature map, $\varphi_F(\pi_F)$ is the foreground feature map.

In a second aspect, an embodiment of the present disclosure an image salient object segmentation apparatus based on reciprocal attention between a foreground and a background, including:

a first processing module, configured to obtain a feature map corresponding to a training image based on a convolutional neural backbone network, and obtain a foreground initial feature response and a background initial feature response according to the feature map corresponding to the training image;

a second processing module, configured to obtain a reciprocal attention weight matrix according to the foreground initial feature response and the background initial feature response, and update the foreground initial feature response and the background initial feature response according to the reciprocal attention weight matrix to obtain a foreground feature map and a background feature map;

a training module, configured to train the convolutional neural backbone network according to the foreground feature map and the background feature map based on a cross entropy loss function and a cooperative loss function, to obtain a foreground and background segmentation convolutional neural network model; and a segmentation module, configured to input an image to be segmented into the foreground and background segmentation convolutional neural network model to obtain a foreground prediction result and a background prediction result.

In a possible design, the first processing module is specifically configured to:

input the training image, and extract a branch feature from the training image according to the convolutional neural backbone network to obtain the feature map corresponding to the training image;

perform a foreground feature aggregating on the feature map corresponding to the training image to obtain the foreground initial feature response;

perform a background feature aggregating on the feature map corresponding to the training image to obtain the background initial feature response.

In a possible design, the second processing module is specifically configured to:

obtain a corresponding foreground response map and a corresponding background response map according to the foreground initial feature response and the background initial feature response;

obtain the reciprocal attention weight matrix according to the foreground response map and the background response map;

multiply the foreground initial feature response by the reciprocal attention weight matrix to obtain a first result, and multiply the background initial feature response by the reciprocal attention weight matrix to obtain a second result;

sum the first result and the background initial feature response to obtain the background feature map; and sum the second result and the foreground initial feature response to obtain the foreground feature map.

In a possible design, the cross entropy loss function is specifically:

$$L_{ce}=D_c(\text{Sig}(\varphi_B(\pi_B)),G_B)+D_c(\text{Sig}(\varphi_F(\pi_F)),G_F)$$

Where, $L_{ce}$ is the cross entropy loss function, $\text{Sig}(\cdot)$ is a sigmoid function, $D_c(\cdot)$ is a cross entropy function, $\varphi_B(\pi_B)$ is the background feature map, $\varphi_F(\pi_F)$ is the foreground feature map, $G_B$ is a reference map of a background image, and $G_F$ is a reference map of a foreground map.

In a possible design, the cooperative loss function is specifically:

$$L_{kl}=D_{kl}(\text{Sig}(\phi_B(\pi_B)),1-\text{Sig}(\phi_F(\pi_F)))+D_{kl}(\text{Sig}(\phi_B(\pi_B)),\text{Sig}(\phi_F(\pi_F))),$$

Where, $L_{kl}$ is the cooperative loss function, $D_{kl}(\cdot)$ is a KL distance, $\text{Sig}(\cdot)$ is a sigmoid function, $\varphi_B(\pi_B)$ is the background feature map, and $\varphi_F(\pi_F)$ is the foreground feature map.

In a possible design, after the inputting an image to be segmented into the foreground and background segmentation convolutional neural network model to obtain a foreground prediction result and a background prediction result, the segmentation module is further configured to:

obtain a difference value between the foreground prediction result and the background prediction result to obtain a corresponding difference image; and filter pixel points of the difference image according to a preset threshold to obtain a salient object segmentation result.

In a possible design, the salient object segmentation result is specifically:

$$\text{Sal}=relu(\text{Sig}(\varphi_F(\pi_F))-\text{Sig}(\varphi_B(\pi_B))),$$

Where, Sal is the salient object segmentation result, $relu(\cdot)$ is a ReLU activation function, $\text{Sig}(\cdot)$ is a sigmoid function, $\varphi_B(\pi_B)$ is the background feature map, $\varphi_F(\pi_F)$ is the foreground feature map.

In a third aspect, an embodiment of the present disclosure provides an image salient object segmentation device based on reciprocal attention between a foreground and a background, including: at least one processor and a memory; where the memory stores computer execution instructions;

the at least one processor executes the computer execution instructions stored by the memory such that the at least one processor performs the image salient object segmentation method based on reciprocal attention between a foreground and a background according to any one option of the first aspect.

In a fourth aspect, an embodiment of the present disclosure provides a computer readable storage medium, where the computer readable storage medium stores computer execution instructions that, when executed by a processor, implement the image salient object segmentation method based on reciprocal attention between a foreground and a background according to any one option of the first aspect.

The image salient object segmentation method and apparatus based on reciprocal attention between a foreground and a background provided by embodiments of the present disclosure involve, first obtaining a feature map corresponding to a training image based on a convolutional neural backbone network to obtain a multi-scale feature expression of an image, and then obtaining a global interdependence between the foreground and the background of the image according to a reciprocal attention weight matrix taking foreground and background initial feature responses as inputs. Finally, in addition to a cross entropy loss function, the embodiments of the present disclosure design a cooperative loss function to guide multi-branch learning of the foreground and the background, so that a network can generate more complementary foreground and background prediction results with clear boundaries. The embodiments of the present disclosure perform salient object segmentation from a perspective of mutual cooperation between the foreground and the background, and enhance the discriminating ability of the foreground and the background through reciprocal attention between the foreground and the background, thereby improving the segmentation effect of the salient object.

BRIEF DESCRIPTION OF THE DRAWINGS

In order to more clearly illustrate technical solutions of the embodiments of the present disclosure or the prior art, the drawings required in the description of the embodiments or the prior art will be briefly described below. Obviously, the drawings in the following description are only some embodiments of the present disclosure, and other drawings can be obtained according to these drawings by those skilled in the art without creative efforts.

DETAILED DESCRIPTION OF THE EMBODIMENTS

In order to make objectives, technical solutions, and advantages of the embodiments of the present disclosure more clear, the technical solutions in the embodiments of the present disclosure will be clearly and completely described in the following with reference to the accompanying drawings in the embodiments of the present disclosure. It is obvious that the described embodiments are only part of the embodiments of the present disclosure, but not all embodiments. All other embodiments obtained by those skilled in the art based on the embodiments of the present disclosure without creative efforts are within the scope of the present disclosure.

Figure 1:
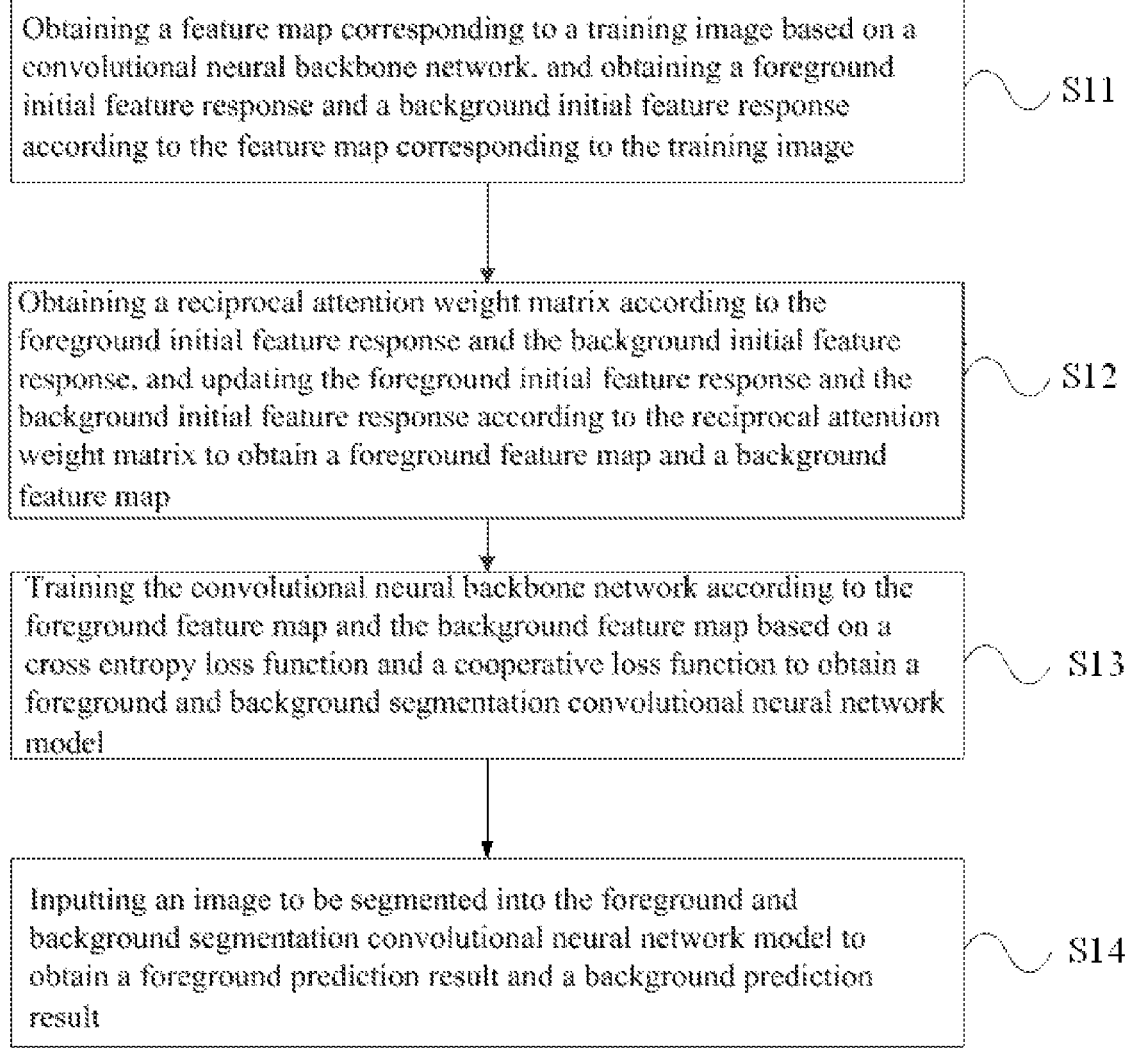
FIG. 1 is a schematic flowchart of an image salient object segmentation method based on reciprocal attention between a foreground and a background provided by an embodiment of the present disclosure.

FIG. 1 is a schematic flowchart of an image salient object segmentation method based on reciprocal attention between a foreground and a background provided by an embodiment of the present disclosure. As shown in FIG. 1, the method includes:

S11: Obtaining a feature map corresponding to a training image based on a convolutional neural backbone network, and obtaining a foreground initial feature response and a background initial feature response according to the feature map corresponding to the training image.

In the embodiment of the present disclosure, branch features are first extracted for each convolution block of the convolutional neural backbone network to obtain a multi-scale feature expression of an image. Specifically, a pre-trained residual network ResNet-50 can be used as the convolutional neural backbone network for extracting features. In the backbone network for feature extraction, there are 5 convolution blocks, and an initial processing is performed on each convolution block, including setting a corresponding pooling stride for each pooling layer, and setting a corresponding dilation rate for a convolution layer to expand a perceptual area of a back layer convolutional layer to a front layer feature map. etc. The feature map extracted by the convolutional neural backbone network is the basis of two-way subnets as described later. Based on the ResNet-50 convolutional neural backbone network, five feature maps of different levels and different scales can be extracted in five convolutional block stages.

After obtaining the feature maps, performing a feature aggregating on the feature maps, may obtain the foreground initial feature response and the background initial feature response.

S12: Obtaining a reciprocal attention weight matrix according to the foreground initial feature response and the background initial feature response, and updating the foreground initial feature response and the background initial feature response according to the reciprocal attention weight matrix to obtain a foreground feature map and a background feature map.

In order to obtain a reciprocal attention between the foreground and the background in an image, the embodiment of the present disclosure proposes a reciprocal attention module, which can characterize a global dependency of context content of the foreground and the background. Given the foreground initial feature response and the background initial feature response as inputs to the reciprocal attention module, two parallel convolution layers are added for each feature response, and convolution kernel and channel number of the convolution layer are set. According to the foreground initial feature response and the background initial feature response, four new feature maps can be obtained. Next, a transposition of one foreground feature map and one background feature map may be calculated by a matrix multiplication, and the reciprocal attention weight matrix may be obtained after passing through a softmax layer, where softmax function is a normalized exponential function and the softmax layer is used to normalize data. The weight matrix measures the effect between any two points in the foreground map and the background map. The more similar the features between two points in the foreground map and the background map, the greater the dependency reciprocal attention between them.

After obtaining the reciprocal attention weight matrix, the weight matrix is further used to update the foreground and background initial feature responses. Taking a calculation of influence of the foreground feature map on the background feature map as an example, a matrix product of the foreground initial feature response and the reciprocal attention weight matrix is first calculated, and then a summation operation with the background initial feature response is performed according to an obtained result to obtain an updated background feature map. In a calculation of influence of the background feature map on the foreground feature map, a matrix product of the background initial feature response and the reciprocal attention weight matrix is first calculated, and then a summation operation with the foreground initial feature response is performed according to an obtained result to obtain an updated foreground feature map.

The foreground and background feature maps updated by the reciprocal attention weight matrix adaptively integrate local features and mutual global dependency, making these updated features more robust to salient object detection.

S13: Training the convolutional neural backbone network according to the foreground feature map and the background feature map based on a cross entropy loss function and a cooperative loss function to obtain a foreground and background segmentation convolutional neural network model.

After computing by the reciprocal attention module, two-way features are still output, which are used for foreground map estimation task and background map estimation task, respectively. To this end, the embodiment of the present disclosure adds three convolution layers after each output after computing by the reciprocal attention module, to perform an initialization processing. After passing through the three convolutional layers, a foreground feature map and a background feature map with the same size as the input image are respectively output. Finally, using a sigmoid layer to minimize two cross entropy loss functions, that is, using a sigmoid function, performs a corresponding processing, to generate a foreground prediction result map and a background prediction result map.

Ideal foreground result map and background result map should be absolutely complementary, and their respective boundaries remain particularly clear, so that intersections of the result maps of the two should be all 0, and unions thereof are all 1. The foreground result map and the background result map obtained through supervision by only using a cross entropy function can well highlight the salient object and suppress messy background. However, the results generated through supervision by only using a cross entropy loss function are not absolutely complementary, and there are some areas where foreground and background are wrongly predicted. In order to reduce such error, the embodiment of the present disclosure designs a cooperative loss function by using an idea of cooperative learning, to quantify the matching degree of predictions of two networks. Through such supervision, the foreground and background prediction results obtained by the proposed network are encouraged to not only be complementary but have clear boundaries. The cooperative loss function includes two items, one is to measure the similarity between the foreground prediction map and a reverse foreground prediction map obtained according to the background prediction map, and the other is to measure the matrix point multiplication result between the foreground prediction map and the background prediction map to be 0 as much as possible. Here, a distance is measured using a KL distance.

S14: Inputting an image to be segmented into the foreground and background segmentation convolutional neural network model to obtain a foreground prediction result and a background prediction result.

The cross entropy loss function and the cooperative loss function are used together as a loss function of model optimization. The stochastic gradient descent algorithm is used as a parameter update method. The learning rate of network parameters changes in "Poly" mode, the loss of the network relative to a training sample is obtained through forward propagation of the network and then the weight of each layer is updated through back propagation, and the foreground and background segmentation convolutional neural network based on reciprocal attention relationship of foreground and background of an image is trained by repeating forward propagation and back propagation multiple times. After the training is completed, the image is input into the network to obtain the foreground prediction result and the background prediction result, respectively.

The image salient object segmentation method based on reciprocal attention between a foreground and a background provided by the embodiment of the present disclosure is obtaining a feature map corresponding to a training image based on a convolutional neural backbone network to obtain multi-scale feature expression of an image, and then obtaining global interdependence between the foreground and the background of the image according to a reciprocal attention weight matrix taking foreground and background initial feature responses as inputs. Finally, in addition to a cross entropy loss function, the embodiment of the present disclosure designs a cooperative loss function to guide multi-branch learning of the foreground and the background, so that a network can generate more complementary foreground and background prediction results with clear boundaries. The embodiment of the present disclosure performs salient object segmentation from a perspective of mutual cooperation between the foreground and the background, and enhances the discriminating ability of the foreground and the background through reciprocal attention between the foreground and the background, thereby improving segmentation effect of the salient object.

The salient object segmentation process in the above embodiments will be described in detail below with reference to FIGS. 2-6 and taking specific embodiments.

In the embodiment of the present disclosure, the size of the training image is obtained according to various parameters of the convolutional neural backbone network, and the size of the training image cannot be arbitrarily changed. In order to describe the process more clearly, it will be explained with reference to FIG. 2.

Figure 2:
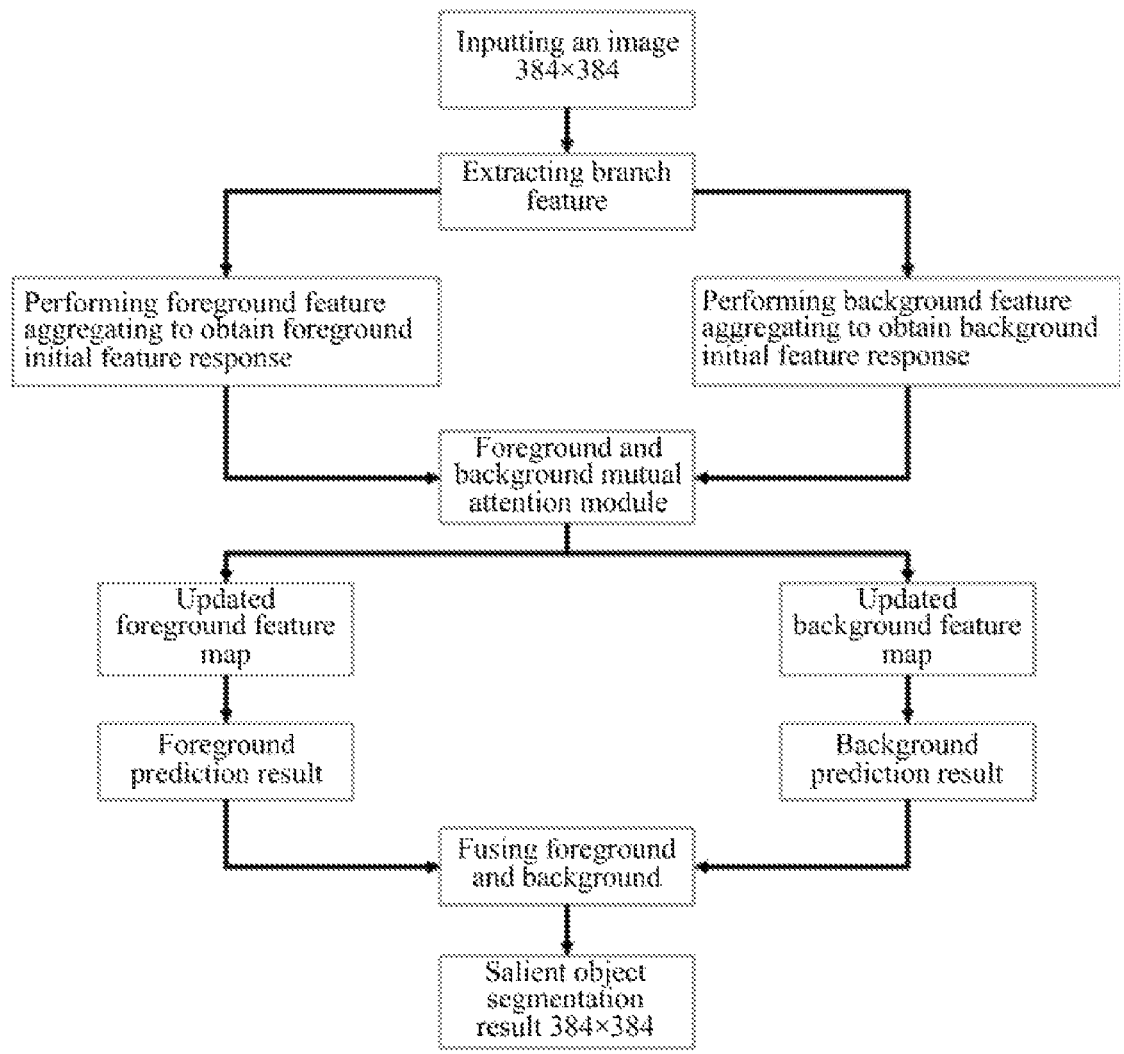
FIG. 2 is a schematic diagram of image salient object segmentation based on reciprocal attention between a foreground and a background provided by an embodiment of the present disclosure.

FIG. 2 is a schematic diagram of image salient object segmentation based on reciprocal attention between a foreground and a background provided by an embodiment of the present disclosure. As shown in FIG. 2, the constructed network first extracts visual features of each branch from an image of a given size of 384×384, and then transmits the visual features to a feature integration module to obtain foreground and background initial local feature responses, respectively. Two initial feature responses from the feature integration module are then input to a reciprocal attention module. Through a matrix multiplication operation, a reciprocal attention weight matrix is obtained, which reciprocal attention weight matrix characterizes a spatial correlation between any two positions in the background and foreground feature response maps, respectively. Then, response values of the reciprocal attention weight matrix at all positions of a specific local feature are aggregated in a residual manner, and used as updated foreground and background initial feature responses.

Therefore, the proposed reciprocal attention module enables two different feature responses to be mutually enhanced in a reciprocal reinforcing manner without considering the distance on a spatial scale. In addition, in addition to using a traditional cross entropy function for supervising and training foreground and background two-way branch networks, the embodiment of the present disclosure also considers respective characteristic of the foreground and the background, and specially designs a cooperative loss function, so that two-way prediction results are more complementary and have clear boundaries. Finally, a final salient object segmentation result is generated by an effective foreground and background fusion strategy.

The above process will be described in detail below with a specific embodiment.

Figure 3:
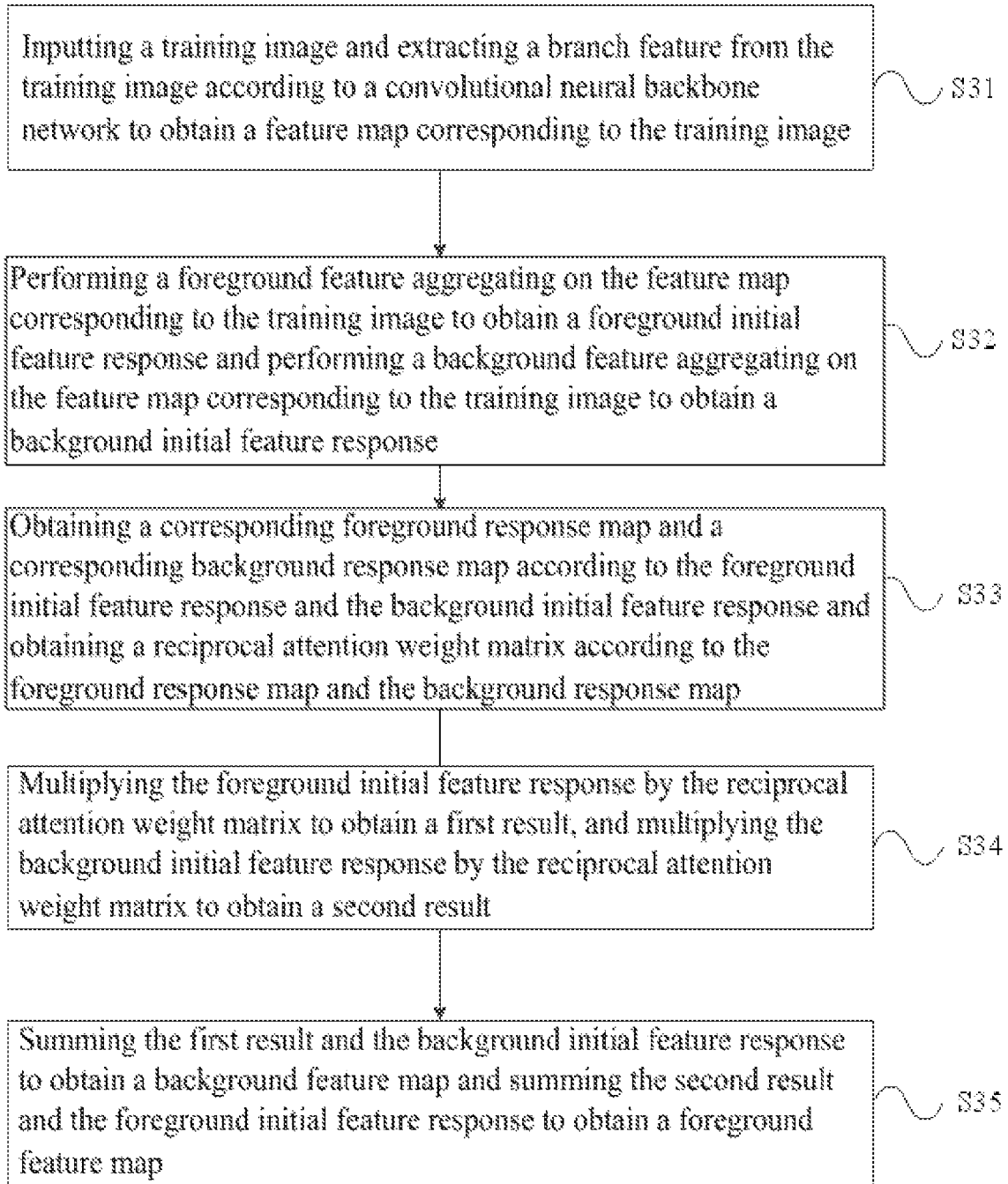
FIG. 3 is a schematic flowchart of a method for obtaining foreground and background feature maps provided by an embodiment of the present disclosure.

FIG. 3 is a schematic flowchart of a method for obtaining foreground and background feature maps provided by an embodiment of the present disclosure. As shown in FIG. 3, the method includes:

S31: Inputting a training image and extracting a branch feature from the training image according to a convolutional neural backbone network to obtain a feature map corresponding to the training image.

Figure 4:
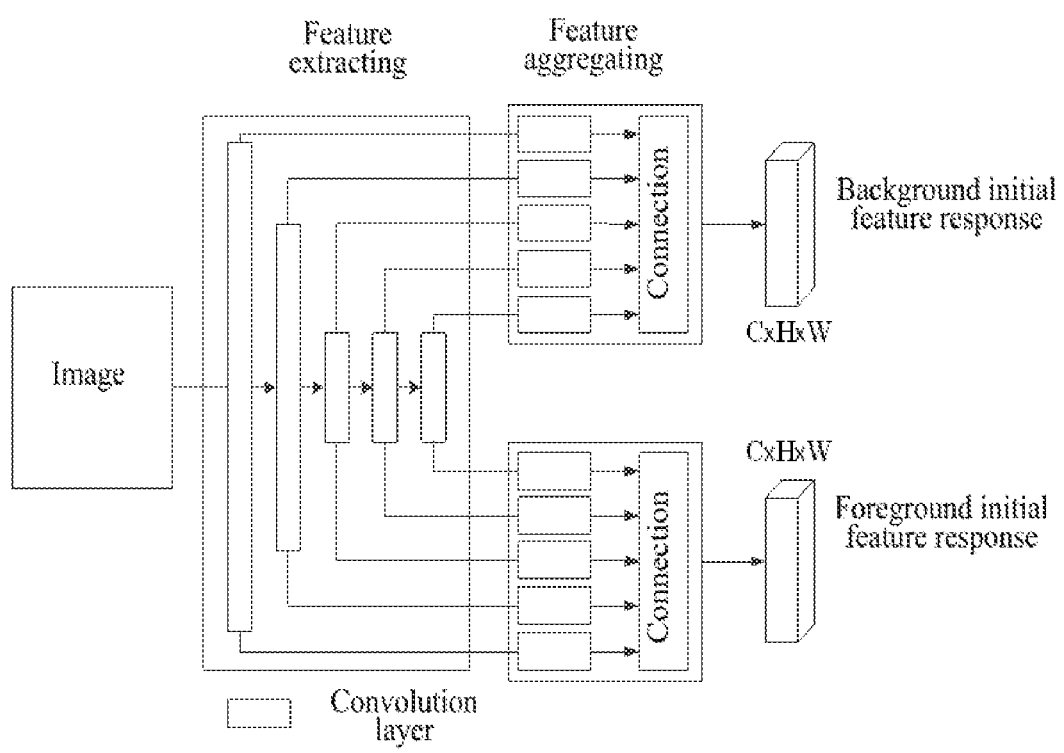
FIG. 4 is a schematic diagram of branch feature extraction through a convolutional neural backbone network, and feature aggregating modules, provided by an embodiment of the present disclosure.

FIG. 4 is a schematic diagram of branch feature extraction through a convolutional neural backbone network, and feature aggregating modules, provided by an embodiment of the present disclosure. As shown in FIG. 4, a pre-trained residual network ResNet-50 is used as the backbone network to extract features. In the backbone network for feature extraction, there are 5 convolutional blocks, and pooling strides for the fourth layer pooling layer and the fifth layer pooling layer of the ResNet-50 are set to 1 to maintain the resolution of the feature maps extracted by the feature extraction backbone network. At the same time, convolution dilation rates for all convolution layers between the third layer pooling layer and the fourth layer pooling layer of the ResNet-50 are set to 2, and convolution dilation rates for all convolution layers between the fourth layer pooling layer and the fifth layer pooling layer of the ResNet-50 are set to 4 to expand a perceptual area of the back layer convolutional layer to the front layer feature map.

The feature maps extracted by the convolutional neural backbone network are the basis of the two-way subnets as described later. Based on the convolutional neural backbone network, five feature maps of different levels and different scales are extracted in five convolutional block stages. The last convolution block outputs a feature map with 2048 channels and a size of ⅛ of the original image size. Here, features are extracted for each convolutional block, and a total of five groups of network branching features are obtained. For convenience of representation, the five convolutional blocks are represented as $\theta_i(\pi_i)$, $i \in \{1, \ldots, 5\}$, where, $\pi_i$ is parameters corresponding to the convolutional blocks $\theta_i$.

S32: Performing a foreground feature aggregating on the feature map corresponding to the training image to obtain a foreground initial feature response and performing a background feature aggregating on the feature map corresponding to the training image to obtain a background initial feature response.

In order to obtain a stronger feature expression, the embodiment of the present disclosure constructs two feature aggregating modules with the same structure, and gives the five feature maps with different scales extracted in S31, and for each branch feature, two convolution layers are added immediately thereafter, where the convolution kernel of the first convolutional layer is 3×3, the number of channels is 256, and the convolution kernel of the second convolutional layer is 1×1, and the number of channels is 256. However, in view of the inconsistency in the resolution of the convolutional features with different scales, the embodiment of the present disclosure sets the dilation rate of the two convolutional layers of the first way to 2, and sets the dilation rate of the first convolutional layer of the second way to 2. As such, all branches output feature map having the same size with a resolution of ⅛ of the original image and a channel number of 256. Finally, after aggregating operation, each feature aggregating module obtains a feature map with a size of ⅛ of the original image and a channel number of 1280, being regarded as the foreground initial feature response and the background initial feature response, respectively.

S33: Obtaining a corresponding foreground response map and a corresponding background response map according to the foreground initial feature response and the background initial feature response and obtaining a reciprocal attention weight matrix according to the foreground response map and the background response map.

Figure 5:
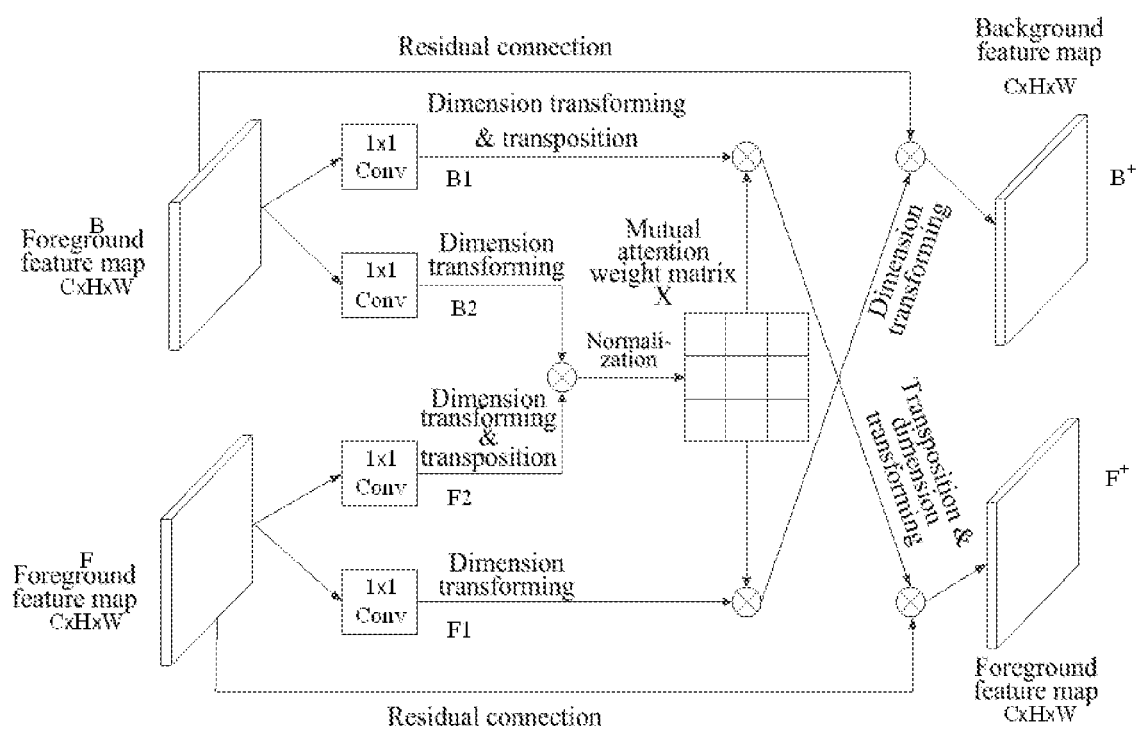
FIG. 5 is a schematic diagram of a reciprocal attention module between a foreground and a background provided by an embodiment of the present disclosure.

After obtaining the foreground initial feature response and the background initial feature response, in order to describe the reciprocal attention between the foreground and the background in the image, the embodiment of the present disclosure proposes a reciprocal attention module for characterizing the global dependency of the context content of the foreground and the background. FIG. 5 is a schematic diagram of a reciprocal attention module between a foreground and a background provided by an embodiment of the present disclosure. As shown in FIG. 5, a foreground initial feature response $F \in R^{C \times H \times W}$ and a background initial feature response $B \in R^{C \times H \times W}$ are given as input of mutual input module, where C is the number of channels and H is a height of the feature map, and W is a width of the feature map. In the embodiment of the present disclosure, two parallel convolution layers are added for each feature response, and the convolution layer has a convolution kernel with a size of 1×1 and has a channel number of 512. In this way, four new feature maps F1, F2, B1, and B2 can be obtained, and the size of each feature map is unchanged {F1, F2, B1, B2}$\in R^{C \times H \times W}$, but the channel number becomes 512. Then reshape layer is used to transform the dimension of the four feature maps, with the feature space dimension becoming $R^{C \times N}$, where N=H×W.

Next, the matrix multiplication of transposed B2 and F2 maps is calculated, and after passing through the softmax layer, the reciprocal attention weight matrix $X \in R^{N \times N}$ is obtained, where elements of the mutual weight matrix are as follows:

$$x_{ij} = \frac{\exp(B2_i, F2_i)}{\sum_{i=1}^{N} \exp(B2_i, F2_i)},$$

Where $x_{ij}$ measures an influence of a position $i^{th}$ in a foreground map on a position $i^{th}$ in a background map. The more similar the features between two points in the foreground and background maps, the greater the reciprocal attention between the two points.

S34: Multiplying the foreground initial feature response by the reciprocal attention weight matrix to obtain a first result, and multiplying the background initial feature response by the reciprocal attention weight matrix to obtain a second result.

S35: Summing the first result and the background initial feature response to obtain a background feature map and summing the second result and the foreground initial feature response to obtain a foreground feature map.

After obtaining the reciprocal attention weight matrix, the weight matrix is further used to update the foreground and background initial feature responses. Taking the influence of the foreground map on the background map as an example, a matrix product of a foreground initial feature response F1 and a reciprocal attention weight matrix X is first calculated to obtain a first result, and then a reshape layer is used to turn the size of the first result back to dimension $R^{C \times H \times W}$. Finally, the element-wise layer is executed to perform a summation operation on the result after the reshape and the background initial feature response B to obtain updated background feature map $B^+ \in R^{C \times H \times W}$:

$$B_j^+ = \alpha \Sigma_{i=1}^{N}(x_{ji}F1_i) + B_j,$$

Where x is the reciprocal attention weight matrix, an initial value of α is 0, and the value gives more weight with gradual learning.

Similarly, the embodiment of the present disclosure uses the same method to explore the influence of the background map on the foreground map. First, the matrix product of the background initial feature response B1 and the reciprocal attention weight matrix X is calculated, and then a reshape layer and a transpose layer are used, where the reshape layer is using a reshape function to readjust the number of rows, columns, and dimensions of the matrix, and the transpose layer is using a transpose function to transpose the matrix. After dimension transforming and transposition, the dimension space becomes $R^{C \times H \times W}$, and the corresponding element summation operation is performed with the foreground initial feature response F to obtain updated foreground feature map $F^+ \in R^{C \times H \times W}$:

$$F_j^+ = \beta \Sigma_{i=1}^{N}(x_{ji}B1_i) + F_j,$$

Likewise, an initial value of β is 0, the value gives more weight with gradual learning.

So far, the foreground and background feature maps updated with the reciprocal attention weight matrix adaptively integrate local features and mutual global dependency, making these updated features more robust to the salient object detection.

After obtaining the foreground feature map and the background feature map, the loss function needs to be obtained to train the model.

The first is the cross entropy loss function. After computing by the reciprocal attention module, two-way features are still output, which are used for foreground map estimation and background map estimation tasks, respectively. To this end, the embodiment of the present disclosure adds three convolution layers after each way output after computing by the reciprocal attention module, which are two convolution layers with a convolution kernel of 3×3 and a channel number of 128, and one convolution layer with a convolution kernel of 1×1 and a channel number of 1, respectively. After passing through the three convolution kernels, a foreground feature map $\varphi_F (\pi_F)$ and a background feature map $\varphi_B (\pi_B)$ with the same size as the input image with a size of H×W are respectively output. Finally, by minimizing two cross entropy loss functions using a sigmoid layer, the final foreground prediction result map and background prediction result map are generated. The loss function $L_{ce}$ is:

$$L_{ce} = D_c(\text{Sig}(\varphi_B(\pi_B)), G_B) + D_c(\text{Sig}(\varphi_F(\pi_F)), G_F),$$

Where, Sig(·) is a sigmoid function, $D_c(\cdot)$ is a cross entropy function, $G_B$ is a reference map of a background image, and $G_F$ is a reference map of a foreground map. The cross entropy reflects the distance between an actual output and a desired output, and the smaller the value of the cross entropy, the closer the actual output is to the desired output.

Figure 6:
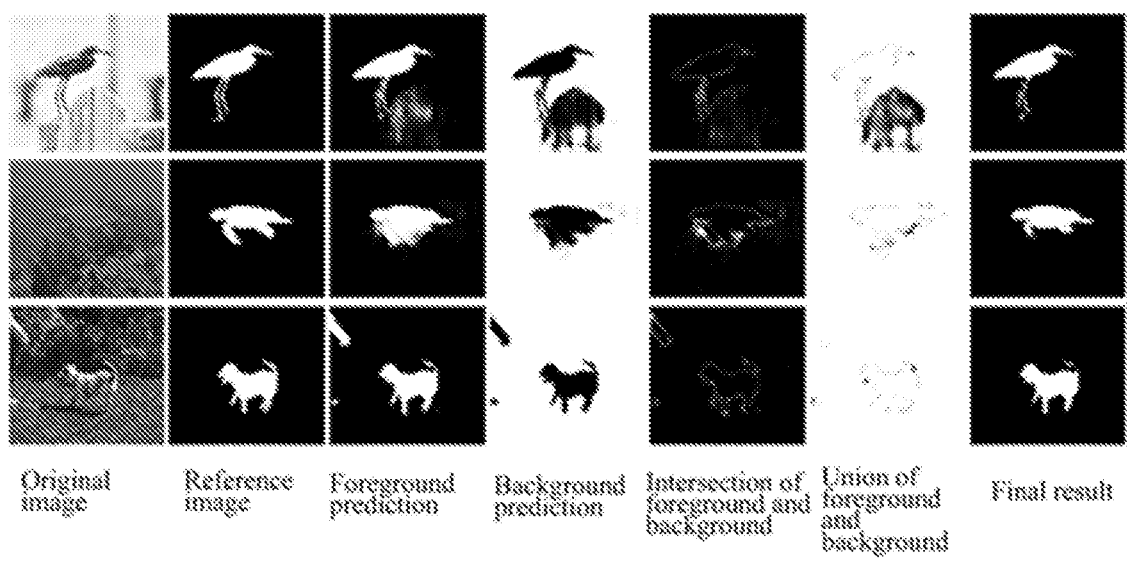
FIG. 6 is a schematic diagram of illustrating prediction results using a cooperative loss function provided by an embodiment of the present disclosure.

The ideal foreground result map and background result map should be absolutely complementary, and their respective boundaries remain particularly clear, so that intersections of the result maps of the two should be all 0, and unions thereof are all 1. FIG. 6 is a schematic diagram of illustrating prediction results using a cooperative loss function provided by an embodiment of the present disclosure. As shown in FIG. 6, the first column corresponds to an inputted original image; the second column is a reference map corresponding to the inputted original image; the third column is a foreground prediction result map calculated using only a cross entropy loss function; the fourth column is a background prediction result map calculated using only a cross entropy loss function; the fifth column is an intersection map of results of the third column and the fourth column; the sixth column is an union map of results of the third column and the fourth column; the last column is a final salient object segmentation result map obtained by a joint supervision of the cross entropy loss function and the cooperative loss function. It can be seen that the foreground result map (the third column) and the background result map (the fourth column) obtained through supervision by only using the cross entropy function can well highlight the salient object and suppress the messy background. However, by calculating the intersection result of the foreground result map and the background result map (the fifth column), it can be seen that the foreground and background maps will produce blurred boundaries, not being particularly clear, and thus the intersection result map produces some outliers at the boundaries. From the union result of the foreground result map and the background result map (the sixth column), it can be seen that the results of the two are not absolutely complementary, and there are some areas where the foreground and the background are wrongly predicted.

In order to reduce such errors, the embodiment of the present disclosure additionally designs a cooperative loss function to quantify the matching degree of predictions of two networks by an idea of cooperative learning. Through this kind of supervision, the foreground and background prediction results obtained by the proposed network are encouraged to not only be complementary but have clear boundaries. The cooperative loss function $L_{ld}$ is:

$$L_{kl}=D_{kl}(\text{Sig}(\phi_B(\pi_B)),1-\text{Sig}(\phi_F(\pi_F))+D_{kl}(\text{Sig}(99_B(\pi_B)), \text{Sig}(\phi_F(\pi_F)),$$

Here, .* represents matrix point multiplication, $L_{kl}$ is the cooperative loss function, $D_{kl}(\cdot)$ is a KL distance, $\text{Sig}(\cdot)$ is a sigmoid function, $\phi_B(\pi_B)$ is a background feature map, and $\varphi_F(\pi_F)$ is a foreground feature map.

After obtaining the loss function, the embodiment of the present disclosure uses the cross entropy loss function and the cooperative loss function together as a loss function for model optimization. A stochastic gradient descent algorithm is used as a parameter update method. The learning rate of network parameters is changed by a "Poly" mode, and the network obtains a loss of the network relative to a training sample through forward propagation and then updates weight value of each layer through back propagation, and the convolutional neural backbone network is trained by repeating forward propagation and back propagation multiple times to obtain the foreground and background segmentation convolutional neural network model.

Figure 7:
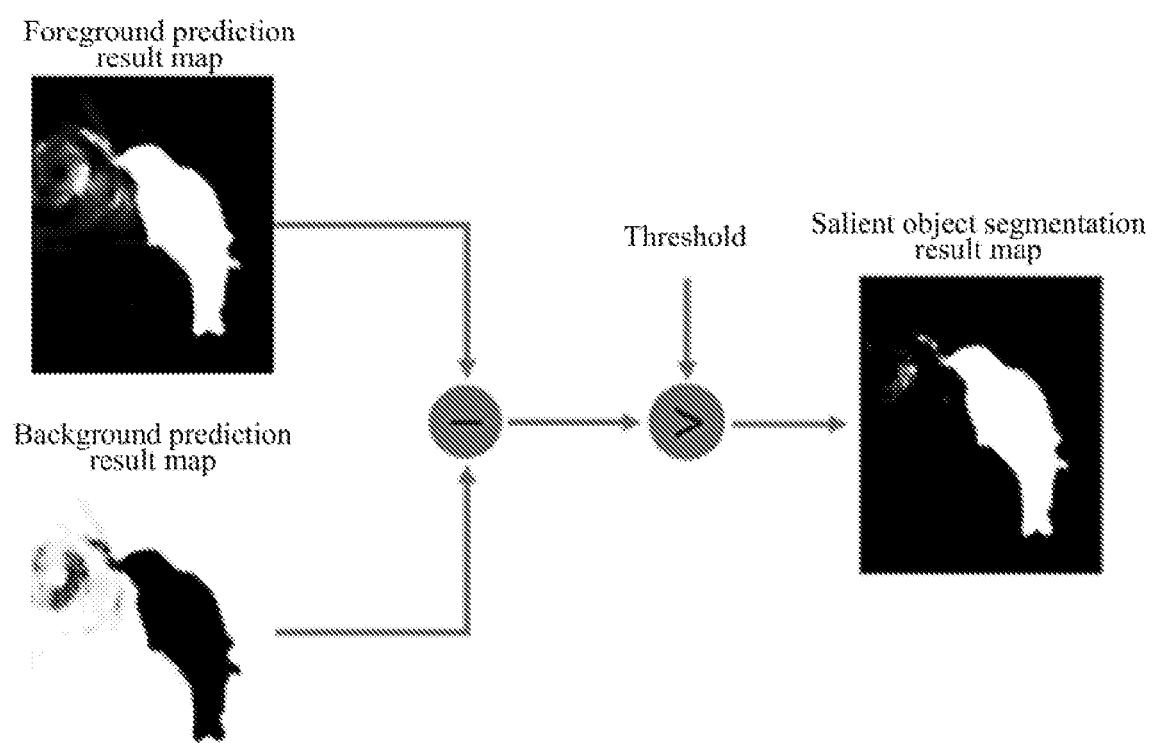
FIG. 7 is a schematic diagram of fusion of prediction results of a foreground and a background provided by an embodiment of the present disclosure.

After the training is completed, an image to be segmented is input into the network to obtain the foreground prediction result and the background prediction result, respectively. In the embodiment of the present disclosure, after obtaining the foreground prediction result and the background prediction result, the foreground prediction result and the background prediction result are fused. FIG. 7 is a schematic diagram of fusion of prediction results of a foreground and a background provided by an embodiment of the present disclosure. As shown in FIG. 7, specifically, the embodiment of the present disclosure uses a background subtraction operation based strategy to fuse the foreground prediction result and the background prediction result. First a difference value between the foreground prediction result map and the background prediction result map is calculated to obtain a corresponding difference image, which will only show an intensity change corresponding to pixel position in the two prediction result maps. Then, a preset threshold is set on the difference image, and a pixel intensity of the difference image is filtered based on the preset threshold, and finally a final salient object segmentation result Sal is obtained:

$$\text{Sal}=relu(\text{Sig}(\varphi_F(\pi_F))-\text{Sig}(\varphi_B(\pi_B))),$$

where Sal is the salient object segmentation result, rel(·) is a ReLU activation function, Sig(·) is a sigmoid function, $\varphi_B(\pi_B)$ is a background feature map, $\varphi_F(\pi_F)$ is a foreground feature map. This fusion strategy not only increases pixel-level discrimination, but also captures context contrast information.

The image salient object segmentation method based on reciprocal attention between a foreground and a background provided by the embodiment of the present disclosure re-examines the salient object segmentation problem from a new perspective of mutual cooperation of foreground and background. Firstly, a feature map corresponding to a training image is obtained based on a convolutional neural backbone network to obtain a multi-scale feature expression of an image, and then a novel attention module is proposed to capture a global feature reciprocal attention between the foreground and the background and global interdependence between foreground and background of the image is obtained according to a reciprocal attention weight matrix taking foreground and background initial feature responses as inputs. Finally, in addition to a cross entropy loss function, the embodiment of the present disclosure designs a cooperative loss function to guide multi-branch learning of the foreground and the background, so that a network can generate more complementary foreground and background prediction results with clear boundaries. The embodiment of the present disclosure performs the salient object segmentation from a perspective of mutual cooperation between the foreground and the background, and enhances the discriminating ability of the foreground and the background through reciprocal attention between the foreground and the background, thereby improving segmentation effect of the salient object.

Figure 8:
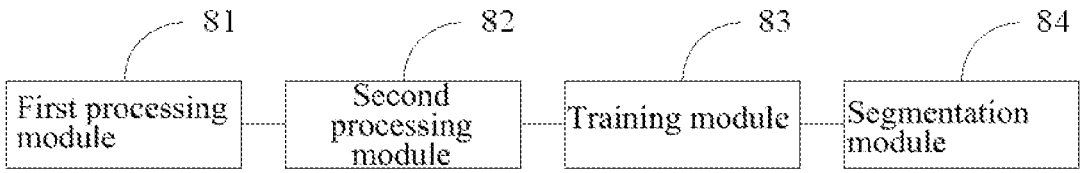
FIG. 8 is a schematic structural diagram of an image salient object segmentation apparatus based on reciprocal attention between a foreground and a background provided by an embodiment of the present disclosure.

FIG. 8 is a schematic structural diagram of an image salient object segmentation apparatus based on reciprocal attention between a foreground and a background provided by an embodiment of the present disclosure. As shown in FIG. 8, the apparatus includes: a first processing module 81, a second processing module 82, a training module 83, and a segmentation module 84, where the first processing 81 module is configured to obtain a feature map corresponding to a training image based on a convolutional neural backbone network, and obtain a foreground initial feature response and a background initial feature response according to the feature map corresponding to the training image;

the second processing module 82 is configured to obtain a reciprocal attention weight matrix according to the foreground initial feature response and the background initial feature response, and update the foreground initial feature response and the background initial feature response according to the reciprocal attention weight matrix to obtain a foreground feature map and a background feature map;

the training module 83 is configured to train the convolutional neural backbone network according to the foreground feature map and the background feature map based on a cross entropy loss function and a cooperative loss function to obtain a foreground and background segmentation convolutional neural network model; and the segmentation module 84 is configured to input an image to be segmented into the foreground and background segmentation convolutional neural network model to obtain a foreground prediction result and a background prediction result.

In a possible design, the first processing module 81 is specifically configured to:

input the training image, and extract a branch feature from the training image according to the convolutional neural backbone network to obtain the feature map corresponding to the training image;

perform a foreground feature aggregating on the feature map corresponding to the training image to obtain the foreground initial feature response;

perform a background feature aggregating on the feature map corresponding to the training image to obtain the background initial feature response.

In a possible design, the second processing module 82 is specifically configured to:

obtain a corresponding foreground response map and a corresponding background response map according to the foreground initial feature response and the background initial feature response;

obtain the reciprocal attention weight matrix according to the foreground response map and the background response map;

multiply the foreground initial feature response by the reciprocal attention weight matrix to obtain a first result, and multiply the background initial feature response by the reciprocal attention weight matrix to obtain a second result;

sum the first result and the background initial feature response to obtain the background feature map;

sum the second result and the foreground initial feature response to obtain the foreground feature map.

In a possible design, the cross entropy loss function is specifically:

$$L_{ce}=D_c(\text{Sig}(\varphi_B(\pi_B)),G_B)+D_c(\text{Sig}(\varphi_F(\pi_F)),G_F),$$

Where, $L_{ce}$ is the cross entropy loss function, $\text{Sig}(\cdot)$ is a sigmoid function, $D_c(\cdot)$ is a cross entropy function, $\varphi_B(\pi_B)$ is the background feature map, $\varphi_F(\pi_F)$ is the foreground feature map, $G_B$ is a reference map of a background image, and $G_F$ is a reference map of a foreground map.

In a possible design, the cooperative loss function is specifically:

$$L_{kl}=D_{kl}(\text{Sig}(\phi_B(\pi_B)),1-\text{Sig}(\phi_F(\pi_F)))+D_{kl}(\text{Sig}(\phi_B(\pi_B)),\text{Sig}(\phi_F(\pi_F))),$$

Where, $L_{kl}$ is the cooperative loss function, $D_{kl}(\cdot)$ is a KL distance, $\text{Sig}(\cdot)$ is a sigmoid function, $\varphi_B(\pi_B)$ is the background feature map, and $\varphi_F(\pi_F)$ is the foreground feature map.

In a possible design, after the inputting an image to be segmented into the foreground and background segmentation convolutional neural network model to obtain a foreground prediction result and a background prediction result, the segmentation module 84 is further configured to:

obtain a difference value between the foreground prediction result and the background prediction result to obtain a corresponding difference image;

filter pixel points of the difference image according to a preset threshold to obtain a salient object segmentation result.

In a possible design, the salient object segmentation result is specifically:

$$\text{Sal}=relu(\text{Sig}(\varphi_F(\pi_F))-\text{Sig}(\varphi_B(\pi_B))),$$

Where, Sal is the salient object segmentation result, $relu(\cdot)$ is a ReLU activation function, $\text{Sig}(\cdot)$ is a sigmoid function, $\varphi_B(\pi_B)$ is the background feature map, $\varphi_F(\pi_F)$ is the foreground feature map.

The apparatus provided by the embodiment of the present disclosure can be used to implement the technical solutions of the foregoing method embodiments, and has similar implementation principle and technical effects, and details are not described herein again.

Figure 9:
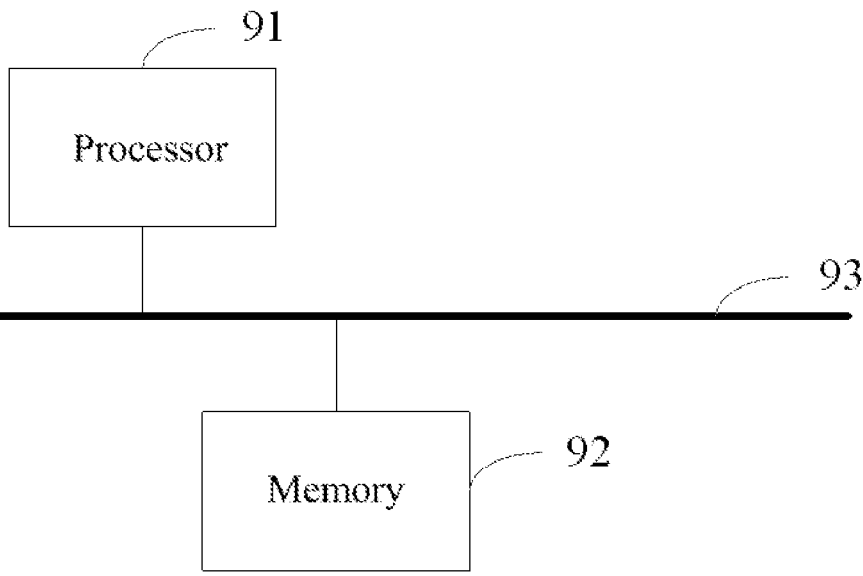
FIG. 9 is a schematic structural diagram of hardware of an image salient object segmentation apparatus based on reciprocal attention between a foreground and a background provided by an embodiment of the present disclosure.

FIG. 9 is a schematic structural diagram of hardware of an image salient object segmentation apparatus based on reciprocal attention between a foreground and a background provided by an embodiment of the present disclosure. As shown in FIG. 9, the image salient object segmentation apparatus based on reciprocal attention between a foreground and a background includes: at least one processor 91 and a memory 92. Where the processor 91 and the memory 92 are connected by a bus 93.

Optionally, the model determinately further include a communication component. For example, the communication component may include a receiver and/or a transmitter.

In a specific implementation process, the at least one processor 91 executes computer execution instructions stored by the memory 92 such that the at least one processor 91 performs the image salient object segmentation method based on reciprocal attention between a foreground and a background as above.

A specific implementation process by the processor 91 may refer to the foregoing method embodiments, and has similar implementation principle and technical effects, and details are not described herein again.

In the embodiment shown in FIG. 9 above, it should be understood that the processor may be a central processing unit (CPU for short), or may additionally be a general purpose processor, a digital signal processor (DSP for short), an application specific integrated circuit (ASIC for short), and the like. The general purpose processor may be a microprocessor or any conventional processor or the like. The steps of the method disclosed with reference to the invention may be directly realized by execution through hardware processor or through a combination of a hardware module and a software module in a processor.

The memory may contain a high speed RAM memory and may also include a non-volatile memory NVM, such as at least one disk memory.

The bus may be an industry standard architecture (ISA) bus, a peripheral component interconnection (PCI) bus, or an extended industry standard architecture (EISA) bus, and the like. The bus can be divided into an address bus, a data bus, a control bus, and the like. For ease of representation, the bus in the drawings of the present application is not limited to only one bus or one type of bus.

The present application provides a computer readable storage medium, where the computer readable storage medium stores computer execution instructions, and the computer execution instructions, when executed by a processor, implement the image salient object segmentation method based on reciprocal attention between a foreground and a background as described above.

For the computer readable storage medium described above, the readable storage medium may be implemented by any type of volatile or non-volatile storage device or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a magnetic disk or an optical disk. The readable storage medium may be any available media that can be accessed by a general purpose or special purpose computer.

An exemplary readable storage medium is coupled to a processor, such that the processor can read information from the readable storage medium and can write information to the readable storage medium. Of course, the readable storage medium may also be a part of the processor. The processor and the readable storage medium may be located in an application specific integrated circuit (ASIC for short). Of course, the processor and the readable storage medium may also reside as discrete components in the device.

The division of the unit is only a logical function division, and there may be another division manner in an actual implementation. For example, multiple units or components may be combined or may be integrated into another system, or some features may be ignored or not executed. In addition, the mutual coupling or direct coupling or communication connection shown or discussed may be an indirect coupling or communication connection through some interfaces, devices or units, and may be in an electrical, mechanical or other form.

The units described as separate components may or may not be physically separated, and the components displayed as units may or may not be physical units, that is, may locate in one place, or may be distributed to multiple network units. Some or all of the units may be selected according to actual needs to achieve purposes of the solutions of the embodiments.

In addition, functional units in embodiments of the present disclosure may be integrated into one processing unit, or the units may exist physically separately, or two or more units may be integrated into one unit.

The functions may be stored in a computer readable storage medium if implemented in the form of a software functional unit and sold or used as a standalone product. Based on such understanding, the technical solution of the present disclosure, essentially or the part that contributes to the prior art, or a part of the technical solution, may be embodied in the form of a software product, which is stored in a storage medium, including instructions for causing a computer device (which may be a personal computer, a server, or a network device, etc.) to perform all or part of the steps of the methods described in embodiments of the present disclosure. The foregoing storage medium includes various media that can store program codes, such as a U disk, a mobile hard disk, a read only memory (ROM), a random access memory (RAM), a magnetic disk, or an optical disk, and the like.

Those skilled in the art will understand that all or part of the steps to implement the method embodiments described above may be accomplished by hardware associated with program instructions. The aforementioned program may be stored in a computer readable storage medium. The program, when executed, performs the steps included in the foregoing method embodiments; and the aforementioned storage medium includes various media that can store program codes, such as a ROM, a RAM, a magnetic disk, or an optical disk, and the like.

Finally, it should be noted that the above embodiments are merely to illustrate the technical solutions of the present disclosure, and are not intended to be limiting; although the present disclosure has been described in detail with reference to the foregoing embodiments, those skilled in the art should understand that the technical solutions described in the foregoing embodiments may be modified, or some or all of the technical features may be equivalently replaced; and these modifications or substitutions do not make the essence of corresponding technical solutions deviate from the scope of the technical solutions of the embodiments of the present disclosure.

What is claimed is:

1. An image salient object segmentation method based on reciprocal attention between a foreground and a background, comprising:
   obtaining a feature map corresponding to a training image based on a convolutional neural backbone network, and obtaining a foreground initial feature response and a background initial feature response according to the feature map corresponding to the training image;
   obtaining a reciprocal attention weight matrix according to the foreground initial feature response and the background initial feature response, and updating the foreground initial feature response and the background initial feature response according to the reciprocal attention weight matrix to obtain a foreground feature map and a background feature map;
   training the convolutional neural backbone network according to the foreground feature map and the background feature map based on a cross entropy loss function and a cooperative loss function, to obtain a foreground and background segmentation convolutional neural network model; and
   inputting an image to be segmented into the foreground and background segmentation convolutional neural network model to obtain a foreground prediction result and a background prediction result.

2. The method according to claim 1, wherein the obtaining a feature map corresponding to a training image based on a convolutional neural backbone network, and obtaining a foreground initial feature response and a background initial feature response according to the feature map corresponding to the training image, specifically comprises:
   inputting the training image, and extracting a branch feature from the training image according to the convolutional neural backbone network to obtain the feature map corresponding to the training image;
   performing a foreground feature aggregating on the feature map corresponding to the training image to obtain the foreground initial feature response; and
   performing a background feature aggregating on the feature map corresponding to the training image to obtain the background initial feature response.

3. The method according to claim 1, wherein the obtaining a reciprocal attention weight matrix according to the foreground initial feature response and the background initial feature response, and updating the foreground initial feature response and the background initial feature response according to the reciprocal attention weight matrix to obtain a foreground feature map and a background feature map, specifically comprises:
   obtaining a corresponding foreground response map and a corresponding background response map according to the foreground initial feature response and the background initial feature response;
   obtaining the reciprocal attention weight matrix according to the foreground response map and the background response map;
   multiplying the foreground initial feature response by the reciprocal attention weight matrix to obtain a first result, and multiplying the background initial feature response by the reciprocal attention weight matrix to obtain a second result;
   summing the first result and the background initial feature response to obtain the background feature map; and
   summing the second result and the foreground initial feature response to obtain the foreground feature map.

4. The method according to claim 1, wherein the cross entropy loss function is specifically:

$$L_{ce}=D_c(\text{Sig}(\varphi_B(\pi_B)),G_B)+D_c(\text{Sig}(\varphi_F(\pi_F)),G_F),$$

wherein, $L_{ce}$ is the cross entropy loss function, $\text{Sig}(\cdot)$ is a sigmoid function, $D_c(\cdot)$ is a cross entropy function, $\varphi_B(\pi_B)$ is the background feature map, $\varphi_B(\pi_B)$ is the foreground feature map, $G_B$ is a reference map of a background image, and $G_F$ is a reference map of a foreground map.

5. The method according to claim 1, wherein the cooperative loss function is specifically:

$$L_{kl}=D_{kl}(\text{Sig}(\phi_B(\pi_B)),1-\text{Sig}(\phi_F(\pi_F)))+D_{kl}(\text{Sig}(\phi_B(\pi_B)),\text{Sig}(\phi_F(\pi_F))),$$

wherein, $L_{kl}$, is the cooperative loss function, $D_{kl}(\cdot)$ is a KL distance, $\text{Sig}(\cdot)$ is a sigmoid function, $\varphi_B(\pi_B)$ is the background feature map, and $\varphi_B(\pi_B)$ is the foreground feature map.

6. The method according to claim 1, wherein after the inputting an image to be segmented into the foreground and background segmentation convolutional neural network model to obtain a foreground prediction result and a background prediction result, the method further comprises:
 obtaining a difference value between the foreground prediction result and the background prediction result to obtain a corresponding difference image; and
 filtering pixel points of the difference image according to a preset threshold to obtain a salient object segmentation result.

7. The method according to claim 6, wherein the salient object segmentation result is specifically:

$$\text{Sal}=relu(\text{Sig}(\varphi_F(\pi_F))-\text{Sig}(\varphi_B(\pi_B))),$$

wherein, Sal is the salient object segmentation result, relu(·) is a ReLU activation function, Sig(·) is a sigmoid function, $\varphi_B(\pi_B)$ is the background feature map, $\varphi_B(\pi_B)$ is the foreground feature map.

8. An image salient object segmentation device based on reciprocal attention between a foreground and a background, comprising: at least one processor and a memory; wherein
 the memory stores computer execution instructions;
 the at least one processor executes the computer execution instructions stored by the memory such that the at least one processor performs the image salient object segmentation method based on reciprocal attention between a foreground and a background according to claim 1.

9. A non-transitory computer readable storage medium, wherein the non-transitory computer readable storage medium stores computer execution instructions that, when executed by a processor, implement the image salient object segmentation method based on reciprocal attention between a foreground and a background according to claim 1.

* * * * *